Jan. 1, 1957  J. HIRSHSTEIN  2,776,054
GREASE AND OIL INTERCEPTOR
Filed Feb. 23, 1954  4 Sheets-Sheet 1
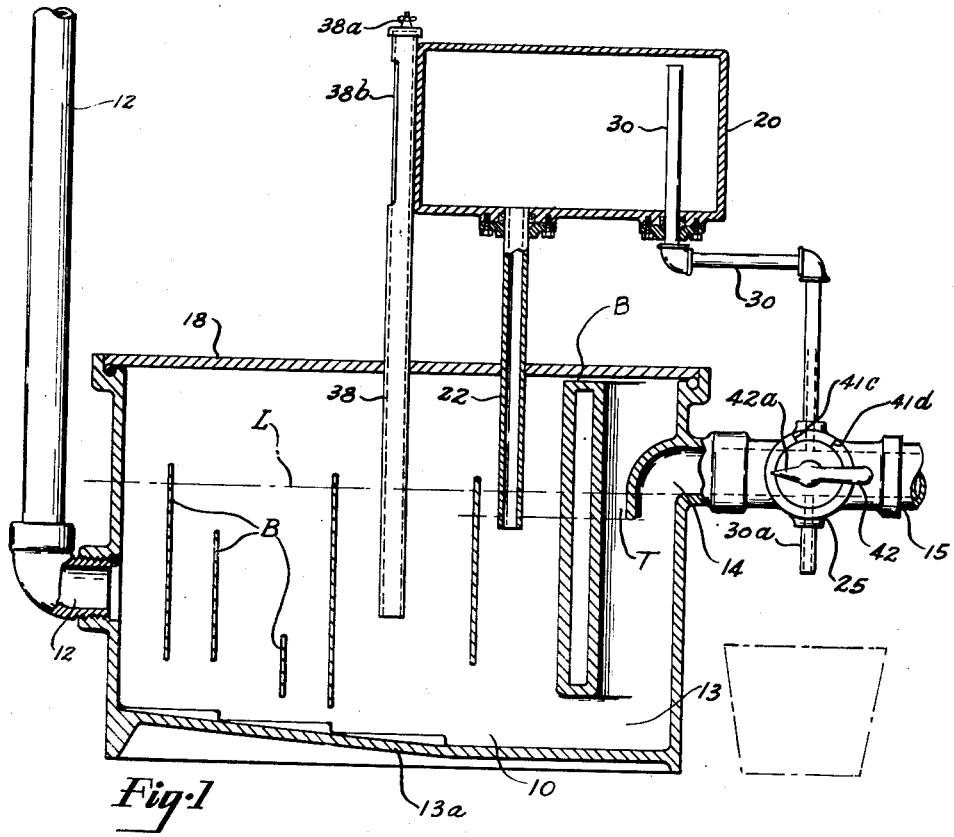
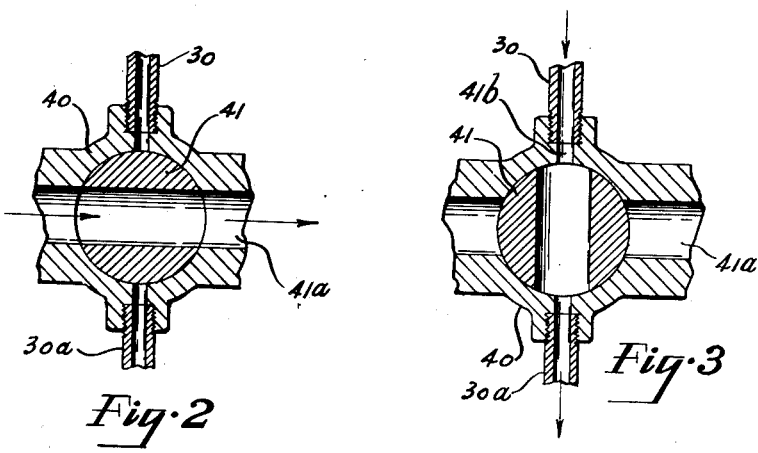
INVENTOR.
JOSEPH HIRSHSTEIN
BY
Albert R. Golrick
ATTORNEY INVENTOR.
JOSEPH HIRSHSTEIN
BY Albert R. Golrick
ATTORNEY Jan. 1, 1957 J. HIRSHSTEIN 2,776,054
GREASE AND OIL INTERCEPTOR
Filed Feb. 23, 1954 4 Sheets-Sheet 4

INVENTOR.
JOSEPH HIRSHSTEIN
BY
Albert R. Golrick
ATTY.

United States Patent Office 2,776,054
Patented Jan. 1, 1957

2,776,054

GREASE AND OIL INTERCEPTOR

Joseph Hirshstein, Miami Beach, Fla., assignor to Ruth R. Newman, Chicago, Ill.

Application February 23, 1954, Serial No. 411,619

11 Claims. (Cl. 210—56)

This invention is directed to improvements in grease separators of the continuous flow type and particularly to such grease interceptors when provided with grease and oil removers of the gravity displacement type.

Generally the invention is concerned with the provision of a grease interceptor of the type referred to wherein the means for removing the accumulated greases or oils from the apparatus by increasing the pressure within the entire apparatus can be effected in a simple, foolproof manner.

This invention also is concerned with the provision and arrangement of certain structural features incorporated in grease and oil interceptors of the commercially well known continuous flow type, which have required frequent servicing if efficiency of grease and oil removal from the effluent is to be maintained; the present purpose of the structural changes being to provide a gravity column comprising a zone of grease and oil segregation within the main body of the device immediately adjacent the path of continuous flow of the effluent through the separator and in such manner as to maintain the overall height of the apparatus within the confines of accepted standards of installation.

More specifically this invention includes the provision and disposition of a multiple valving means which must be operated in a sequential manner first to seal the outlet of the separator thereby to effect an increase in the pressure within the separator as the effluent continues to flow thereunto and thereafter to effect a grease and oil discharge to the atmosphere without interrupting or destroying the sustained elevated condition of the effluent and grease and oil separating column.

A still more specific object of the present invention is the provision of a duplex outflow control valve for separators of the type referred to which incorporates a grease and oil discharge valve that cannot be opened to the atmosphere before the outlet line of the separator apparatus is closed completely. Other objects of this invention will become apparent from the following description referring to the accompanying drawings and having a preferred embodiment thereof.

In the drawings, Fig. 1 shows a grease and oil separator of the continuous flow type equipped with this invention;

Fig. 2 is a cross section taken through the valve mechanism along a vertical plane through the center of the outlet as shown in Fig. 1 and showing the position of the valve means under ordinary continuous flow operating conditions of the apparatus;

Fig. 3 illustrates the outlet shut-off position of the valving means when the separator apparatus is conditioned to discharge the accumulated greases and oils to the receptacle at atmospheric pressure;

Figure 4:
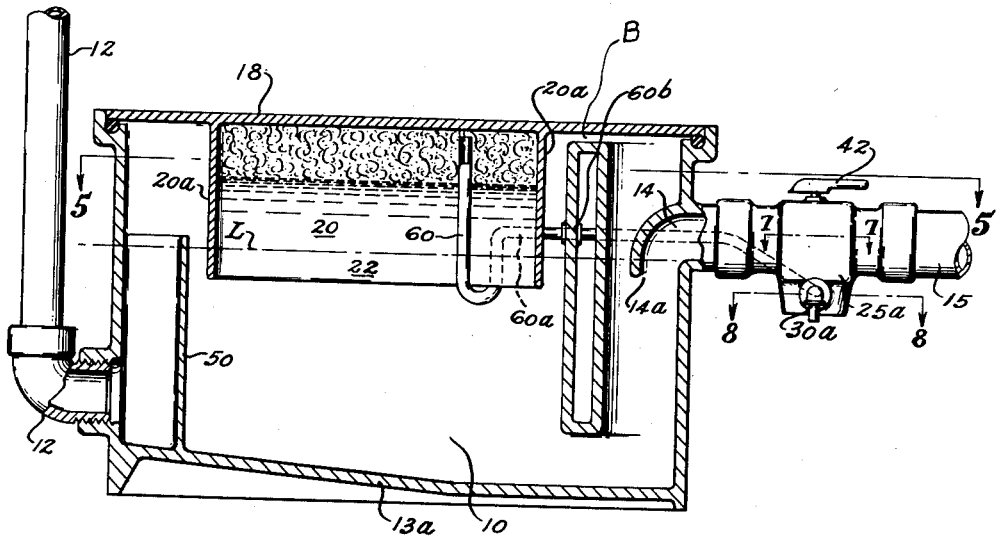
Fig. 4 shows in elevational cross section the application of this invention to a different arrangement of the atmospherically sustained column housed within the structure of the separating chamber.

It has now been determined that it is commercially practical to equip grease and oil interceptors or separators with an automatic oil and grease skimming means comprising a sustained elevated column atmospherically sealed at the top but open at the bottom which is submerged in the effluent to a position slightly below the normal liquid level of the separating chamber of the apparatus. The column is established by flooding the apparatus through stoppage of the outlet and while bleeding out the air at the top of the column through a relief valve. Should this valve be opened, even slightly, after the apparatus is thus conditioned for continuous operation, atmospheric pressure would destroy the sustained elevation of the column and the grease and oil skimming or removing function of the column would be prevented.

The pressure increase to effect establishment of the column is obtained by increase of effluent head in the inlet line to the apparatus when the outlet is blocked or valved shut. Should the outlet be partly open when the column bleeder valve is open, the influence of atmospheric pressure would prevail at all points within the system and the column would be lowered or lost. It is apparent that when such an apparatus is placed under the care of a clean-up man or porter, when installed in restaurants, hotels, club houses, etc., the chances of mishandling the apparatus when extracting the accumulated greases and oils are high. With the arrangement disclosed in the drawings the chances of mishandling have been reduced considerably by associating the column bleeder valve with the separator shut-off valve in such manner that the outlet line of the apparatus will always be closed before the bleeder valve can be opened. This leave only one precaution to be taken when servicing the apparatus, namely that the flow of effluent or water in the inlet line should be continued and the head in the inlet line increased to a height equal to at least that of the sustained column before the grease and oil draw off or bleeder valve is opened.

In referring to the drawings in Fig. 1 the apparatus is shown in cross sectional elevation to have the commercially known form of grease separator comprising a separating chamber or basin structure 10 usually rectangular in basin shape with an inlet 12 at one end and an outlet channel 13 at the other end. The bottom 13a slopes from inlet to outlet to facilitate flushing out of non-floating solids. It will be noted that the inlet enters the separating chamber below the normal level L of the effluent which is determined by the height of the outlet elbow 14 above the inlet. Baffles B may be used or omitted as desired.

An atmospherically sealed grease and oil accumulating chamber structure 20 is shown disposed above the closure lid 18 of the separating chamber and a column structure 22 extends through the closure lid 18 from a position slightly below the normal water level L in the separating chamber to the bottom of the accumulating chamber structure 20. The outlet elbow 14 connects to the discharge line 15 and the latter has a valve mechanism 25 which controls both the outlet line 15 and an oil and grease discharge connection or draw off line 30 extending between the valve mechanism and the top region of the sealed chamber 20. The inlet 12 is connected to the discharge line of a dish washer, sink or other source of grease and oil bearing effluent or discharge liquid and the separating of the grease and oil takes place within the chamber 10 in the well known manner by rising to the top surface of the body of effluent within the chamber at a level approximating the normal level L; the column 22 and accumulating chamber 20 having been filled or charged with the relatively heavy effluent or water for a purpose and in a manner comprising no part of the present invention. Entrained air escapes at a trap T to the outlet when pressure builds up to break the liquid seal.

As the bottom of the separated grease and oil layer within the chamber 10 is depressed to the lower open end of the column 22, the lighter gravity greases and oils pass upwardly through column 22 and displace an equal volume of the heavier liquid being sustained in the vessel 20. The vessel 20 accordingly may be made of a transparent material to afford visibility of contents or a window opening may be provided in an opaque wall of the vessel whereby the caretaker may know when the apparatus needs servicing or emptying of the accumulated greases and oils from the vessel, usually when the level of the relatively heavy effluent in the vessel 20 has been depressed by the accumulated greases and oils to the bottom of vessel 20. Extraction is accomplished by closing the discharge line 15 while continuing the discharge of effluent into the inlet 12 with consequent rise of the head of effluent in the inlet pipe 12, it being understood that the entire apparatus is installed at a level several feet below the source of the effluent flow. If desired, a stand pipe gauge or level indicator column 38 to show the location of the head in the inlet pipe structurally independent of the vessel 20 may be provided to extend upwardly from the separating chamber 10 through the lid structure 18. The column 38 would extend from the separating chamber to a height equal to or above the top of the vessel 20 and be provided with a vent valve 38a at its top and a vertically extending window structure 38b to indicate when the inlet pipe level has attained or exceeded the height of the top of the vessel 20. Not until such level is attained can the vessel 20 be opened to atmospheric pressure without the danger of atmospheric pressure gaining ingress to the interior of the vessel 20, thus disrupting the column.

The valve structures shown in Figs. 2 and 3 are designed to facilitate the aforementioned extraction of grease and oil from time to time as conditions indicate while reducing the hazard of the ingress of air into the vessel 20. The valve body 40 is of sufficient size to have the base thereof receive a valving barrel 41 of such diameter that the outlet valve opening 41a may be closed upon turning of the barrel by the indicator handle 42 before the valve port 41b opens the grease and oil discharging line 30. The valve body may carry a marker 41c to which the handle pointer 42a may be set without opening the line 30. When the inlet head is established for maintain the column 22 against atmospheric pressure the caretaker then turns the handle the remainder of the way to a stop 41d, thus opening the line 30 to permit the greases and oils to pass through the valve body to pipe 30a and to a bucket shown by dot and dash lines in Fig. 1. Sufficient time should elapse between the two mentioned manipulations to permit the separating chamber to be filled completely with effluent and build up pressure therein, all of which can be discernible by observation of the liquid level in the column 38. Any air trapped in the top of the separating chamber 10 is compressed without harm to successful operation.

Figure 5:
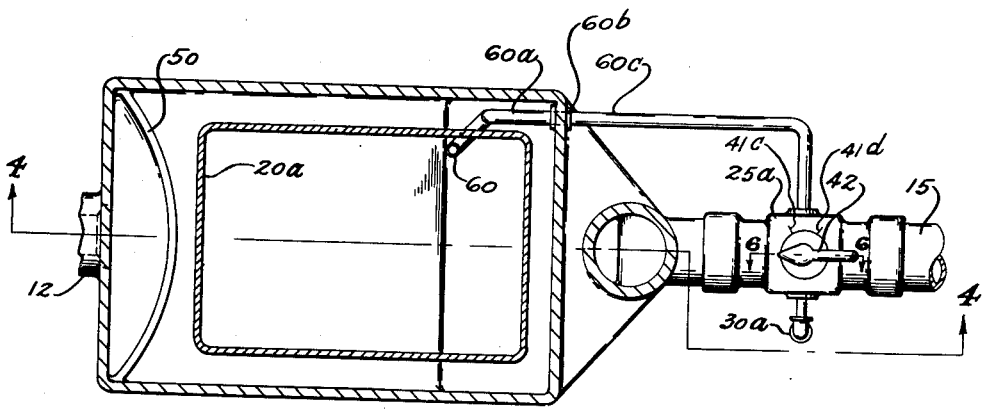
Fig. 5 is a top plan view of the interceptor structure shown in Fig. 4.

Figs. 4 and 5 show a form of the interceptor structure disclosed modified in Fig. 1 in that the accumulator vessel of Fig. 1 becomes an accumulator chamber within the upper region of the effluent separating chamber and the hydrostatic fluid exchange column structure becomes a downward continuation of the side walls of the accumulator chamber to a submerged point in the effluent in the separating chamber substantially below the normal water level as determined by the level of the separating chamber outlet. This construction can be confined within the accepted space practices of architects and designing engineers when specifying the use of grease separators.

It will be noted that in Figs. 1 and 4 the separating chamber structure 10 has the inlet line 12 connected thereto below the static or normal water level L, the outlet structure at 14 being the same in both constructions. But one baffle or deflector 50 is shown closed at the bottom and extending across the inlet end of the separating chamber 10 in Fig. 4. This baffle extends upwardly from the inlet opening to above the static level L. The sloping bottom wall 13a is shown without the steps of the Fig. 1 construction but the outlet end structure is the same in both constructions. The cover or lid 18 has a depending skirt formation comprising downwardly extending walls 20a which terminate in the effluent separating zone a substantial distance below the static level L and below the top of the baffle 50 and below the air trap lip 14a of the outlet structure. These depending walls are spaced from the end and side walls of the separating chamber structure as shown by the dotted lines in Fig. 5, thus leaving an annular air space between the hydrostatic column supported within the walls 20a and the insides of the walls of the separating chamber.

The air entrained in the effluent as it passes down the inlet line 12 is released from the effluent, as the same flows upwardly over the baffle 50, to the described space between the separating and accumulating chambers. This space is in communication with the outlet structure in a known manner at B and the air escapes therefrom past the submerged lip 14a when the pressure thereof becomes sufficient to depress the trap level of the fluid at the outlet.

The greases and oils accumulated at the top of the column constituting the columns 20 and 22 are drawn off through a discharge connection including a tube 60 having a vertically extending reach portion disposed within the column with its upper open end terminating near the top of the accumulating chamber and the lower part thereof formed in a trap leg extending from the bottom region of the column upwardly past the lower rim of the walls 20a into the space between the column structure and the separating chamber structure. The top leg is connected to a horizontally disposed line 60a at about the elevation of the outlet line 15 and the line 60a terminates in a passageway 60b in the exit end wall to which is connected the external line 60c leading to the servicing valve 25a.

The valve means 25a serves the same purpose as the valve means 25 heretofore described with reference to the servicing of the apparatus of Fig. 1 but the axis of the barrel of the valve means 25a is disposed in a vertical position whereby the external grease draw off line 60c may be connected to the valve means in a convenient manner.

Figure 6:
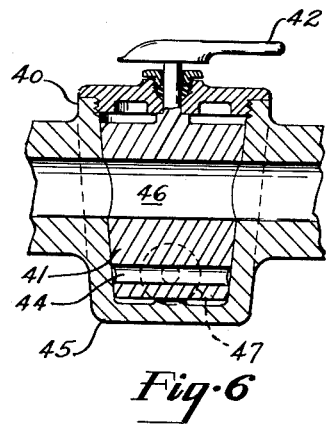
Fig. 6 is a cross sectional elevation of the valve means used in the Fig. 4 construction taken vertically as indicated by the line 6—6 in Fig. 5.
Figure 7:
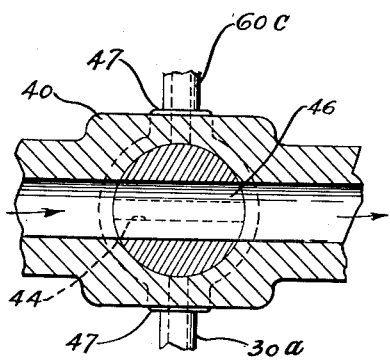
Fig. 7 is a cross sectional view of the valve means taken at a central horizontal plane as indicated by the line 7—7 in Fig. 4.
Figure 8:
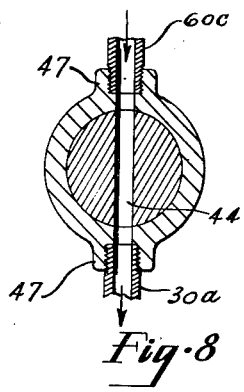
Fig. 8 is a view similar to Fig. 7 but taken as indicated by the line 8—8 in Fig. 4.

It will be noted in Fig. 6 that the grease draw off port 44 is located below the main outlet port 46 of the valve member 41 and is located in a lower part 45 of the valve body below the main outlet branches of the valve body 40. The small branches are disposed normal to the outlet line whereby the draw off connections 60, 60a, 60b and 60c may be connected conveniently to the valve body at a point substantially in horizontal alignment with the bottom formation of the draw off trap structure. With this valve construction the handle 42 will be set between stops to turn only 90°, the construction being such that the port 44 will not be opened until the main outlet port 46 is closed completely. This valve arrangement can also be used when the draw off connection 60c leads from a passageway formed in the cover structure in communication with the top region of the column structure in which instance the trap leg formation in the draw off line will be externally located between such cover passageway and the described valve mechanism.

As long as the liquid level in the inlet is higher than the top of the column structure the draw off action on the separated grease and oil is that of compression. Should the inlet level drop below the top of the column, a syphonic action would take place, since the discharge end of the draw off is below the top of the column in the embodiments shown but the height of the column would not be decreased below the top of the draw off pipe within the column. Thus any air which might find access to the top of the column structure can be ejected through the draw off by raising the liquid level in the inlet. Hence it is desirable that the top end of the draw off line be disposed as close to the top of the column as would be consistently practical. In this respect the mentioned passageway formed in the cover structure would have some advantage over the illustrated arrangements.

The initial priming of the apparatus of Fig. 4 is accomplished in the same manner as that of the apparatus of Fig. 1. The manner of extracting the accumulated greases and oils from the top of the column 20—22 is accomplished likewise in the same manner as the extraction thereof from the Fig. 1 apparatus.

The particular advantage of the Fig. 4 apparatus over the Fig. 1 apparatus is that the former will operate efficiently when the source of effluent is at a much lower elevation relative to the grease separating apparatus. The use of a trap leg in the draw off line prevents the ingress of air to the top of the liquid exchange column should the valve mechanism 25a be turned to draw off position before the proper head of effluent has been attained in the inlet line 12. Hence in the Fig. 4 form the stand pipe gauge 38 of the Fig. 1 apparatus is omitted since observation of the fluid being discharged through the draw off pipe line 60—60b and valve means 25 will indicate the fluid contents of the column. It is also an advantage to have the mechanisms of the apparatus housed in a single outer structure comprising the grease and oil separating basin whereby troublesome floating solids carried into the separating chamber and into the maintained column upon becoming saturated will sink directly to the bottom of the separating chamber and be washed therefrom by the outflowing action of the heavier stripped fluid of the separated effluent. It has been found, also, that the heavy non-buoyant solids will be carried upwardly by the inflowing effluent over the top edge of the baffle means 50 and not deposit beneath the inlet opening. While the space between the top portions of the side and end walls of the body 10 and the depending walls 20a of the column structure (Fig. 4) provide an air dome or vault for the entrained air carried into the separating chamber by the inflowing effluent primarily liberated at the top of the inlet baffle 50, some grease may separate and accumulate in the space. Should such accumulation take place a head of separated grease would eventually depress the static liquid or effluent level therein until the bottom of the ring of grease would reach the bottom edge of the column structure (walls 20a) and then pass upwardly into the column 22. In this manner grease is prevented from passing over into the outlet 14 through the air vent 14a. In the relation of the bottom terminus of the walls 20a to the static liquid level and to the height of the air by-pass 14a below the static level L as shown in Fig. 4 will be found the assurance that no separated grease will escape through the vent during normal operation of the disclosed device.

Figure 10:
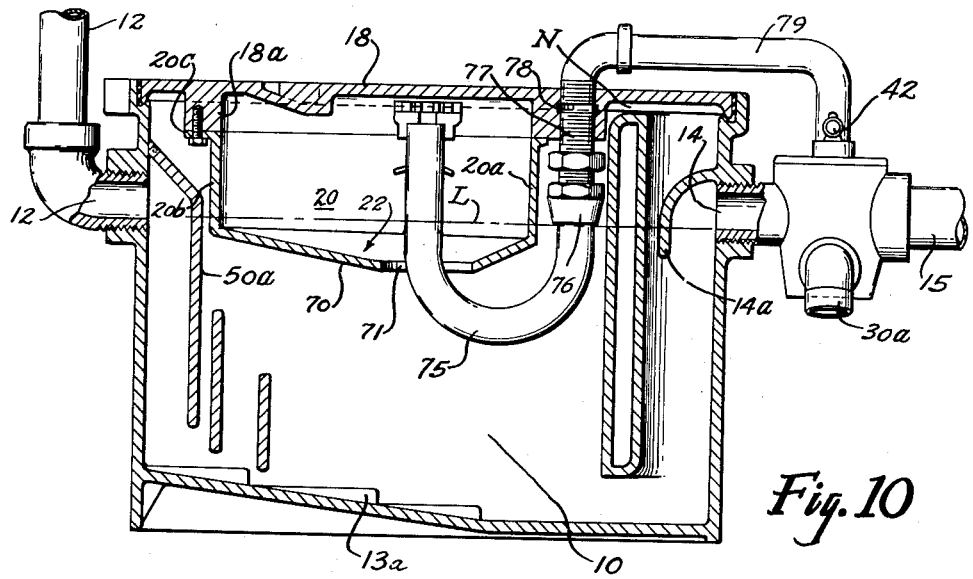
Fig. 10 is an elevational cross section of the device taken along the line 10—10 of Fig. 9.

While the apparatus shown in Figs. 4 and 5 have been found to be operable within the confined operational height limits indicated, it has been found that there is some tendency to accumulation of air as released from the inflowing effluent within the confines of the walls 20a forming the accumulator column. It has also been found that the performance of the Fig. 4 structure can be improved by closing the major part of the bottom opening of the accumulator column with an integral wall 70, as shown in Fig. 10, which slopes downwardly to a grease and oil ingress opening 71. This bottom wall is disposed below the normal level L of the effluent which is determined as hereinbefore stated by the elevation of the outlet 14. In this Fig. 10 structure the inlet 12 is located at the same level as the outlet and the baffle member 50a terminates at an elevated position above the inlet and is disposed in loose contact with the inlet and wall so that air may pass into the rectilinear cavity or space between the walls of the basin structure and the walls 20b of the column or accumulator structure. As air is liberated from the inflowing effluent a considerable part of it is liberated within the confines of baffle 50a and passes into the air cavity which communicates with the outlet through passageway N and through trap 14a to the outlet. The air liberated after the effluent passes baffle 50a escapes upwardly into contact with the sloping bottom 70 which guides it to the air cavity surrounding the top of the column structure.

Figure 9:
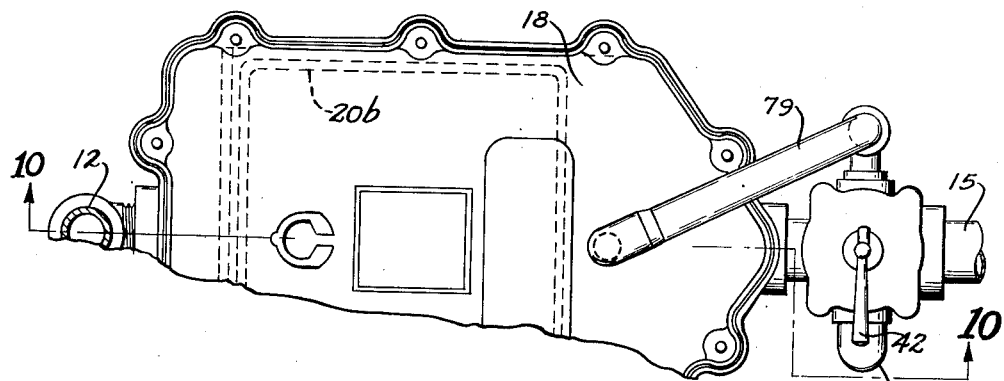
Fig. 9 is a plan view of a commercial form of the invention.
Figure 11:
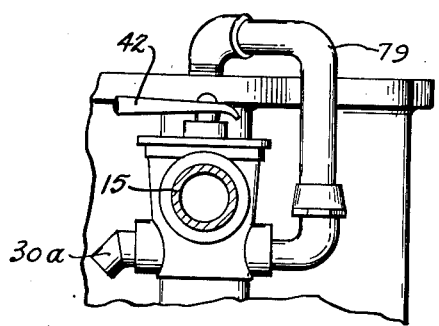
Fig. 11 is a fragmentary end view of the outlet end of the device shown in Figs. 9 and 10.

In the construction of Figs. 9 and 10 the valve mechanism hereinbefore described is used but the draw off line for extracting the accumulated greases and oils comprises a U piece 75 with one leg extending from the top of the column and with the other leg connected by a union 76 to a nipple 77 threaded into a vertical passageway 78 formed in the cover. Thus the draw off or discharge connection extends through the opening 71. A pipe line 79 extends slightly above the cover from the passageway 78 to the valve mechanism as hereinbefore described.

To facilitate manufacture the column walls 20b and bottom wall 70 are cast as one shell with a flange 20c secured to a depending rib 18a formed on the inner side of the cover 18. Thus the column structure and the draw off pipe may be assembled on the cover before the latter is secured to the basic structure.

The structure of Fig. 10 as will be noted is confined in height and well adapted to economic manufacture and should the servicing thereof be neglected the grease and oil bearing effluent would simply pass through the apparatus until such time as the accumulator column 20—22 is emptied in the manner hereinbefore described with respect to the servicing of the apparatus of Figs. 1 and 4, it being understood that the lid structure 18 is sealed to the basin structure of the apparatus.

From the foregoing it is to be seen that this invention provides in a grease and oil separating apparatus means for efficiently servicing the device when needed while preventing the ingress of atmospheric pressure to the top of the sustained grease and oil skimming column except when sufficient pressure due to head in the inlet is present in the system to counterbalance the atmospheric pressure at the top of the column when greases and oils are escaping therefrom under atmospheric pressure conditions. By the use of a trap leg in the drawing off line the same results may be obtained.

I claim:

1. In combination a continuous flow type grease separating basin structure adapted to hold liquid under atmospheric pressure having a removable top wall sealed thereto, a grease skimmer structure comprising a downwardly open atmospherically sealed chamber dependent from the removable top wall to confine and sustain a column of relatively heavy effluent extending upwardly from the liquid in the separating basin and at the top of which the lighter gravity separated grease accumulates by displacement of part of the sustained column of heavy effluent, said basin having an inlet, an outlet structure leading from the bottom region of the separating basin to an outlet discharge line, vertically spaced above the bottom of the said chamber to determine a normal liquid level in the basin, a shut-off valve means located in said outlet discharge line and a grease discharging connection leading from the top region of said chamber and the therein sustained column to said valve means, said valve means comprising a closure means for closing said outlet discharge line and a grease discharging valve means.

2. In combination a continuous flow type grease separating basic structure adapted to hold liquid under atmospheric pressure having a removable cover sealed thereon, a grease skimmer structure comprising a downwardly open atmospherically sealed column structure depending from the cover sustaining a liquid column of relatively heavy effluent extending upwardly from the liquid in the separating basin and at the top of which the lighter gravity separated grease accumulates by displacing part of the sustained column of liquid, said basin having an inlet, an outlet structure leading from the bottom region of the separating basin to an outlet discharge line located adjacent the top of the separating basin and above the bottom of the column structure, a shut-off valve means located in said outlet discharge line, a grease discharging connection leading from the top region of said column structure to said valve means, said valve means comprising a closure means for closing said outlet discharge line and a grease discharging valve means sequentially operative relative to operation of the outlet closing valve means.

3. In combination a continuous flow type grease separating basin structure for containing liquid under atmospheric pressure including a top wall sealed thereon, a grease skimmer structure comprising an atmospherically sealed column structure suspended from said top wall and sustaining a column of relatively heavy effluent liquid extending upwardly from the liquid in the separating basin and at the top of which the lighter separated grease accumulates by displacing part of the sustained column of liquid, said basin having an inlet, an outlet structure leading from the bottom region of the separating basin to an outlet discharge line located adjacent the top of the separating basin establishing a normal liquid level in the basin above the bottom of the column structure, a shut-off valve means located in said outlet line, a grease discharging connection leading from the top region of said column structure to said valve means and including a liquid trap formation, said valve means comprising a closure means for closing said outlet discharge line and a grease discharging valve means sequentially operable relative to operation of the outlet closing valve means.

4. In combination a continuous flow type grease and oil separating basin structure for containing liquid under atmospheric pressure including a top wall, a grease and oil skimmer structure comprising a column structure suspended from the top wall and atmospherically sealed to sustain an elevated liquid column of relatively heavy effluent extending upwardly from the liquid in the separating basin and at the top of which the lighter gravity separated grease accumulates by displacement of part of the sustained column, said skimmer structure being disposed within the separating basin structure in spaced relation to the walls of the separating basin, said separating basin having an inlet line extending vertically above the top of the column structure comprising the grease and oil skimmer structure, an outlet line leading from the separating basin, a shut-off valve means located in said outlet line, a grease discharging connection including a leg and trap structure leading from the top region of said column structure through a wall of the separating basin structure to said valve means, said valve means comprising a closure means for closing said outlet line and a grease discharging valve means for opening said grease discharging connection for discharge of the accumulated greases and oils in the top region of the column structure.

5. In combination a continuous flow type grease separating basin structure adapted to contain a body of liquid under atmospheric pressure therein, a grease skimmer structure comprising an atmospherically sealed column structure disposed within the upper region of the separating basin and adapted to sustain a column of relatively heavy effluent liquid at the top of which the separated lighter gravity grease accumulates by displacement of part of the sustained column of liquid, said separating basin having an inlet line extending vertically above the top of the column structure, an outlet structure leading from the separating basin independently of the column structure to a discharge line for maintaining a liquid level within the basin above the bottom of the column structure, a shut-off valve means located in said outlet line, a grease discharging connection leading from the top region of the column structure to said valve means, said connection including a liquid trap structure and said valve means comprising a closure means for closing said outlet line and a grease discharging valve means in communication with said discharging connection for opening the top region of the column structure for discharge of accumulated greases and oils therein.

6. In combination a continuous flow type grease and oil interceptor comprising a separating basin structure and top structure sealed thereto, a grease and oil skimmer structure within the basin comprising a continuous wall formation depending from the top structure of the separating basin structure, said continuous wall formation being spaced from the side wall structure of the separating basin to form an air space therebetween, said continuous wall formation forming with said top structure a means defining a hydrostatic column open at the bottom to the separating basin and closed to the atmosphere at the top, an effluent inlet line to the lower region of the separating basin structure below the bottom of the column, an outlet structure leading from the lower region of the separating basin at a point remote from the inlet, an air passageway between the outlet structure and the space between the walls of the separating basin and the column, a grease and oil draw off line extending the height of the column with one end opening to the top region of the column, said draw off line being formed into a liquid trap to extend from the bottom of the column to said air space; and exteriorly disposed grease draw off valve means connected to the trap in said air space and a valve means for closing the outlet structure of the interceptor.

7. In combination a continuous flow type grease separating basin structure having an effluent inlet located near the bottom region thereof and an outlet located near the top region thereof thereby determining the initial static liquid level within the basin structure, a cover structure for the basin structure, a hydrostatic column structure disposed within the basin structure to depend from the region of the cover structure downwardly to a plane located below the static liquid level of the separating basin structure, a separate grease and oil draw off line connected to the interior top region of the column structure, a trap formation in said draw off line and a draw off valve in said line adapted to maintain the line atmospherically sealed during normal operation of the apparatus.

8. In combination a continuous flow type grease separating basin structure, a grease skimmer structure combined with the basin structure to form an air vault therebetween and comprising an atmospherically sealed column structure adapted to sustain a column of relatively heavy effluent liquid and disposed within the basin so that the lighter gravity separated grease accumulates at the top of the column by displacing part of the sustained column of liquid, said column structure having a closed bottom with an inlet opening therein, said bottom sloping upwardly away from said inlet opening, an outlet structure leading from the bottom region of the separating basin to an outlet discharge line located adjacent the top of the separating basin, a shut-off valve means located in said outlet line, a grease discharging connection leading from the top region of said column structure to a point below the bottom of said column structure and a valve means closing said discharging connection; said air vault being in trapped communication with the said outlet structure of the basin whereby air released within the separating basin structure will be guided upwardly by said sloping bottom to the air vault.

9. In combination a continuous flow type grease separating basin with an air-tight top wall, an outlet structure leading from the bottom region of the basin establishing a normal liquid level in the basin, a grease skimmer structure depending from said top wall and comprising an atmospherically sealed column structure adapted to form an elevated liquid column of relatively heavy effluent liquid at the top of which the lighter gravity separated grease accumulates by displacement of part of the elevated column of liquid, said skimmer structure being disposed within the separating basin structure in spaced relation to the basin side walls and with the bottom thereof disposed below the normal liquid level of the basin, said separating basin having an inlet above the said normal liquid level and extending vertically above the top of the grease and oil skimmer structure, a shut-off valve means located in said outlet structure whereby hydrostatic pressure may be produced within the basin and skimmer column upon supply of liquid through said inlet, and a grease discharging connection leading from the top region of the said column structure through a wall of the separating basin structure to a discharge point at a level below the bottom of the skimmer structure.

10. In combination a continuous flow type grease separating basin having air sealed top wall and a grease skimmer structure suspended from the top wall comprising an atmospherically sealed column structure adapted to sustain a column of relatively heavy effluent liquid at the top of which the separated lighter gravity greases and oils accumulate by displacement of said heavier liquid, said skimmer column structure comprising side walls and a bottom wall, an inlet and an outlet for the separating basin disposed above the bottom wall of the skimmer structure, said outlet determining a normal liquid level in the basin, said inlet being above the normal liquid level determined by the outlet and communicating with an air space between the column structure and the top and vertical walls of the separating basin, said bottom wall of the skimmer column structure having an opening disposed below the normal liquid level of the separating basin and said bottom wall being sloped outwardly and upwardly from the bottom opening toward said air space whereby the residue of air liberated in the separating basin from the effluent passing through said inlet which has not escaped from said inlet into said air space will be guided thereto from the separating basin.

11. In combination a continuous flow type grease separating basin structure adapted to hold liquid under atmopsheric pressure having a removable top wall sealed thereon, a grease skimmer structure comprising a downwardly open atmospherically sealed column structure supported by the cover sustaining a liquid column of relatively heavy effluent extending upwardly from the liquid in the separating basin and at the top of which the lighter gravity separated grease accumulates by displacing part of the sustained column of liquid, said basin having an inlet, an outlet structure leading from the bottom region of the separating basin to an outlet discharge line located adjacent the top of the separating basin and above the bottom of the column structure, a shut-off valve means located in said outlet discharge line, a grease discharging connection leading from the top region of said column structure to said valve means, said valve means comprising a closure means for closing said outlet discharge line and a grease discharging valve means sequentially operative relative to operation of the outlet closing valve means.

References Cited in the file of this patent

UNITED STATES PATENTS

| | | |
|---|---|---|
| 715,266 | Heston | Dec. 9, 1902 |
| 771,927 | Paradice | Oct. 11, 1904 |
| 1,045,811 | Buhring | Dec. 3, 1912 |
| 1,140,118 | Collins | May 18, 1915 |
| 1,159,044 | Kelly | Nov. 2, 1915 |
| 2,022,118 | Loeb | Nov. 26, 1935 |
| 2,146,542 | Hawley | Feb. 7, 1939 |
| 2,405,705 | Mobley | Aug. 13, 1946 |
| 2,479,386 | Matheis | Aug. 16, 1949 |

FOREIGN PATENTS

| | | |
|---|---|---|
| 9,770 | Great Britain | 1913 |